United States Patent
Gima

(10) Patent No.: US 11,945,190 B2
(45) Date of Patent: Apr. 2, 2024

(54) LAMINATED GLASS

(71) Applicant: AGC Inc., Tokyo (JP)

(72) Inventor: Yuhei Gima, Tokyo (JP)

(73) Assignee: AGC Inc., Tokyo (JP)

( * ) Notice: Subject to any disclaimer, the term of this patent is extended or adjusted under 35 U.S.C. 154(b) by 331 days.

(21) Appl. No.: 17/391,482

(22) Filed: Aug. 2, 2021

(65) Prior Publication Data

US 2021/0362477 A1 Nov. 25, 2021

Related U.S. Application Data

(63) Continuation of application No. PCT/JP2020/006279, filed on Feb. 18, 2020.

(30) Foreign Application Priority Data

Feb. 20, 2019 (JP) ................. 2019-028813

(51) Int. Cl.
| | | |
|---|---|---|
| B32B 17/06 | (2006.01) | |
| B32B 15/04 | (2006.01) | |
| B32B 17/10 | (2006.01) | |

(52) U.S. Cl.
CPC ........ B32B 17/10495 (2013.01); B32B 17/10 (2013.01); B32B 17/10036 (2013.01); B32B 17/10559 (2013.01); B32B 17/10293 (2013.01); B32B 2307/732 (2013.01); B32B 2605/006 (2013.01)

(58) Field of Classification Search
CPC .................... B32B 17/10036; B32B 17/10293
USPC .......................................................... 428/428
See application file for complete search history.

(56) References Cited

U.S. PATENT DOCUMENTS

| | | | |
|---|---|---|---|
| 6,410,120 B1 | 6/2002 | Frost et al. | |
| 2009/0316254 A1 | 12/2009 | Higashida et al. | |
| 2016/0096344 A1 | 4/2016 | Kurihara | |
| 2016/0339676 A1* | 11/2016 | Keller | ............... B32B 17/10605 |
| 2017/0190151 A1* | 7/2017 | Hamano | ........... B32B 17/10788 |
| 2018/0281352 A1 | 10/2018 | Aoki | |
| 2019/0030865 A1* | 1/2019 | Aoki | ......................... B32B 3/02 |

FOREIGN PATENT DOCUMENTS

| | | |
|---|---|---|
| JP | 2000-247691 A | 9/2000 |
| JP | 2007-326763 A | 12/2007 |
| JP | 2009-36967 A | 2/2009 |
| JP | 2015-000821 A | 1/2015 |
| JP | 2018-141891 A | 9/2018 |
| WO | WO 2008/075772 A1 | 6/2008 |
| WO | WO 2015/019925 A1 | 2/2015 |
| WO | WO 2017/099167 A1 | 6/2017 |

* cited by examiner

*Primary Examiner* — Lauren R Colgan
(74) *Attorney, Agent, or Firm* — Oblon, McClelland, Maier & Neustadt, L.L.P.

(57) ABSTRACT

Laminated glass includes a pair of glass plates each having a curvature; an intermediate film located between the pair of glass plates; and a light control element enclosed in the intermediate film. The light control element includes a first resin layer; a second resin layer; and a light control layer held by the first resin layer and the second resin layer. One or more slits are provided in a main surface of the first resin layer.

19 Claims, 10 Drawing Sheets

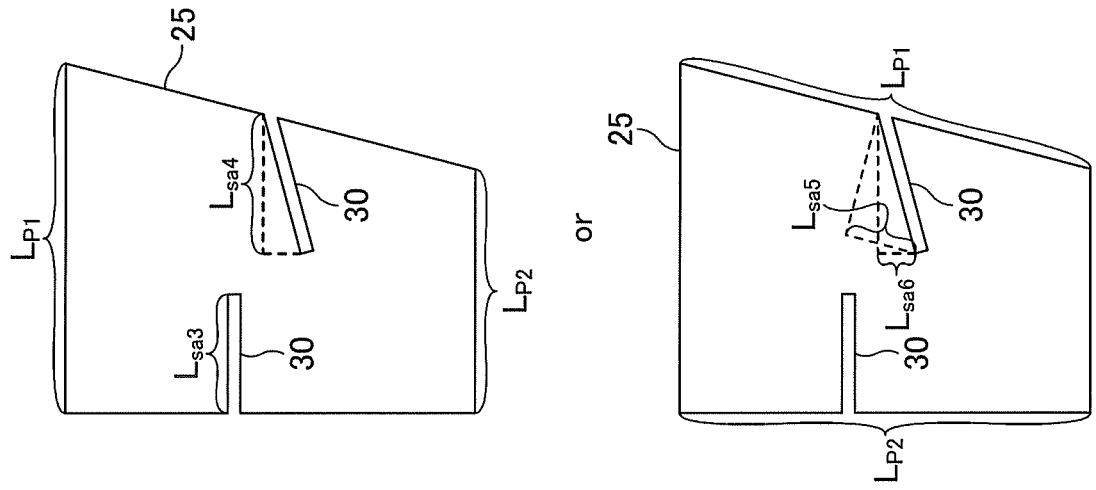
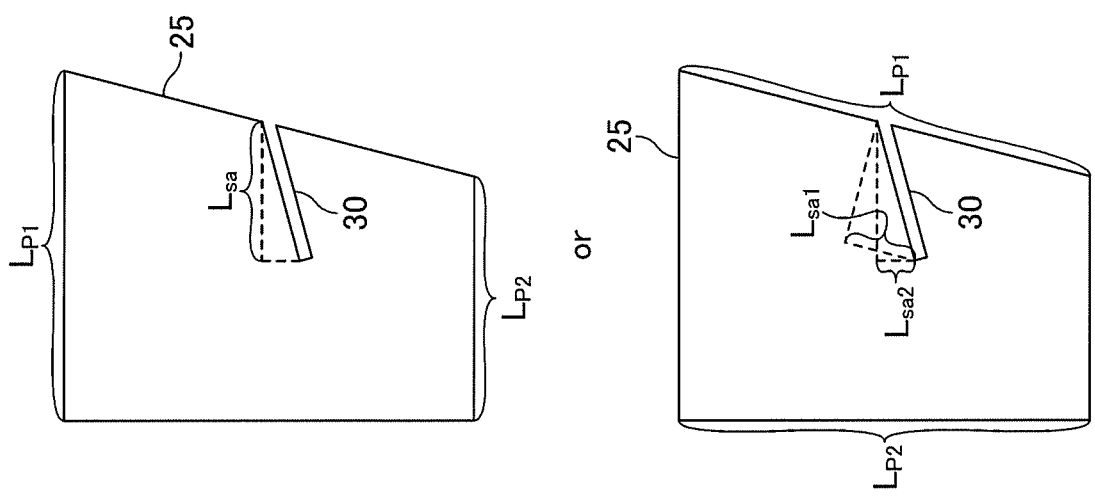
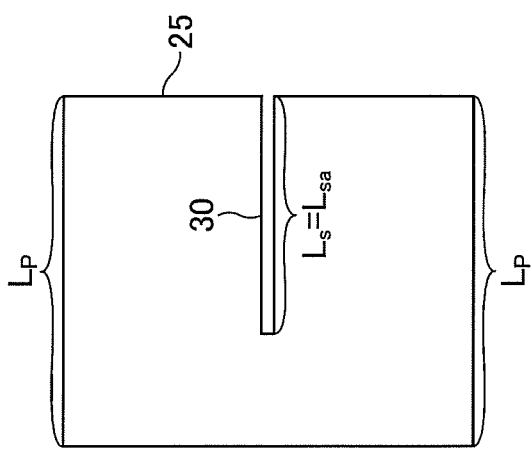

FIG.10

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|
| BENDING DEPTH OF LAMINATED GLASS ON SAME AXIS WITH SLIT IN LAMINATED GLASS [mm] | 60 | 60 | 60 | 60 | 70 | 70 | 80 | 80 | 80 |
| SHORTER SIDE LENGTH OF SLIT [mm] | — | 30 | 30 | 30 | 30 | 30 | 30 | 15 | 60 |
| LONGER SIDE LENGTH OF SLIT Lsa [mm] | — | 800 | 600 | 700 | 800 | 700 | 800 | 800 | 800 |
| Lsa/Lp | — | 0.73 | 0.55 | 0.64 | 0.73 | 0.64 | 0.73 | 0.73 | 0.73 |
| WRINKLES | C | A | B | A | A | B | A | A | A |

LAMINATED GLASS

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2020/006279 filed on Feb. 18, 2020 and designating the U.S., which claims priority to Japanese Patent Application No. 2019-028813 filed on Feb. 20, 2019. The entire contents of the foregoing applications are incorporated herein by reference.

BACKGROUND OF THE INVENTION

1. Field of the Invention

The disclosure herein generally relates to laminated glass.

2. Description of the Related Art

There is a case where laminated glass having a curved surface is used for a window glass of a vehicle or a train. In such laminated glass, for example, a functional film may be enclosed, so that the laminated glass is provided with various functions. The functional film includes, for example, a heat ray reflection film in which a thin film having a function of heat ray reflection or the like is coated on a film-like resin layer formed of polyethylene terephthalate resin or the like as a support layer.

Moreover, another example of the functional film includes a film-like light control element (light control film) with a visible light transmittance that varies when an electric voltage is applied. For example, the light control element has a structure, in which a light control layer is held by two film-like resin layers of polyethylene terephthalate resin or the like (see, for example, WO 2008/075772).

However, when these functional films are enclosed in a curved laminated glass, there is a possibility that the resin layer, serving as the support layer, will be unable to conform to the curved surface, resulting in a wrinkle that mars the appearance. Then, as a method of reducing the wrinkle in the resin layer enclosed in the curved laminated glass, a method of reducing a size of the resin layer with respect to an outer periphery of the laminated glass has been proposed (see, for example, Japanese Unexamined Patent Application No. 2000-247691).

SUMMARY OF INVENTION

Technical Problem

However, with the above-described method, the effect of suppressing the occurrence of wrinkles is insufficient. Particularly, there is a problem in that because the light control element uses two sheets of resin layers, resin in the light control element is thick, and wrinkles become even more noticeable. With the above-described method, wrinkles could not be prevented from occurring on the light control element.

In view of the above-described problem, the present application aims at providing laminated glass, in which a light control element having a resin layer is enclosed, and wrinkles are prevented from occurring on the light control element.

Solution to Problem

According to an aspect of the invention, laminated glass includes a pair of glass plates each having a curvature; an intermediate film located between the pair of glass plates; and a light control element enclosed in the intermediate film. The light control element includes a first resin layer; a second resin layer; and a light control layer held by the first resin layer and the second resin layer, and one or more slits are provided in a main surface of the first resin layer.

Effect of Invention

According to embodiments of the present disclosure, wrinkles can be prevented from occurring on the light control element in the laminated glass in which the light control element having a resin layer is enclosed.

BRIEF DESCRIPTION OF DRAWINGS

FIG. 3A is a diagram illustrating an example of a slit provided in a light control element for explaining a width of the light control element provided on the same axis with the slit;

FIG. 3B is a diagram illustrating another example of a slit provided in a light control element for explaining a width of the light control element provided on the same axis with the slit;

FIG. 3C is a diagram illustrating yet another example of a slit provided in a light control element for explaining a width of the light control element provided on the same axis with the slit;

FIG. 10 is a diagram for explain practical examples and a comparative example.

DETAILED DESCRIPTION OF PREFERRED EMBODIMENTS

In the following, with reference to drawings, embodiments of the present invention will be described. Throughout the drawings, the same elements are assigned the same reference symbols, and duplicate description may be omitted. Moreover, in some of the drawings, the size and shape may be partially exaggerated to facilitate understanding of the contents of the present invention.

Although in the specification, roof glass for a vehicle will be described as an example, the glass according to the embodiment is not limited to this, and is applicable to a windshield, rear glass, side glass, and the like. Moreover, the glass according to the present embodiment is applicable to glass of buildings having curvature. Also, the term vehicle particularly refers to an automobile, the term also refers a mobile body that has glass such as a train, ship, an aircraft, and the like.

Moreover, a plan view refers to viewing a prescribed region of the roof glass in a direction orthogonal to the prescribed region. A planar shape refers to a shape of the prescribed region of the roof glass viewed in the direction orthogonal to the prescribed region.

Moreover, inward of laminated glass in a plan view refers to a direction toward a center of the laminated glass.

First Embodiment

Figure 1A:
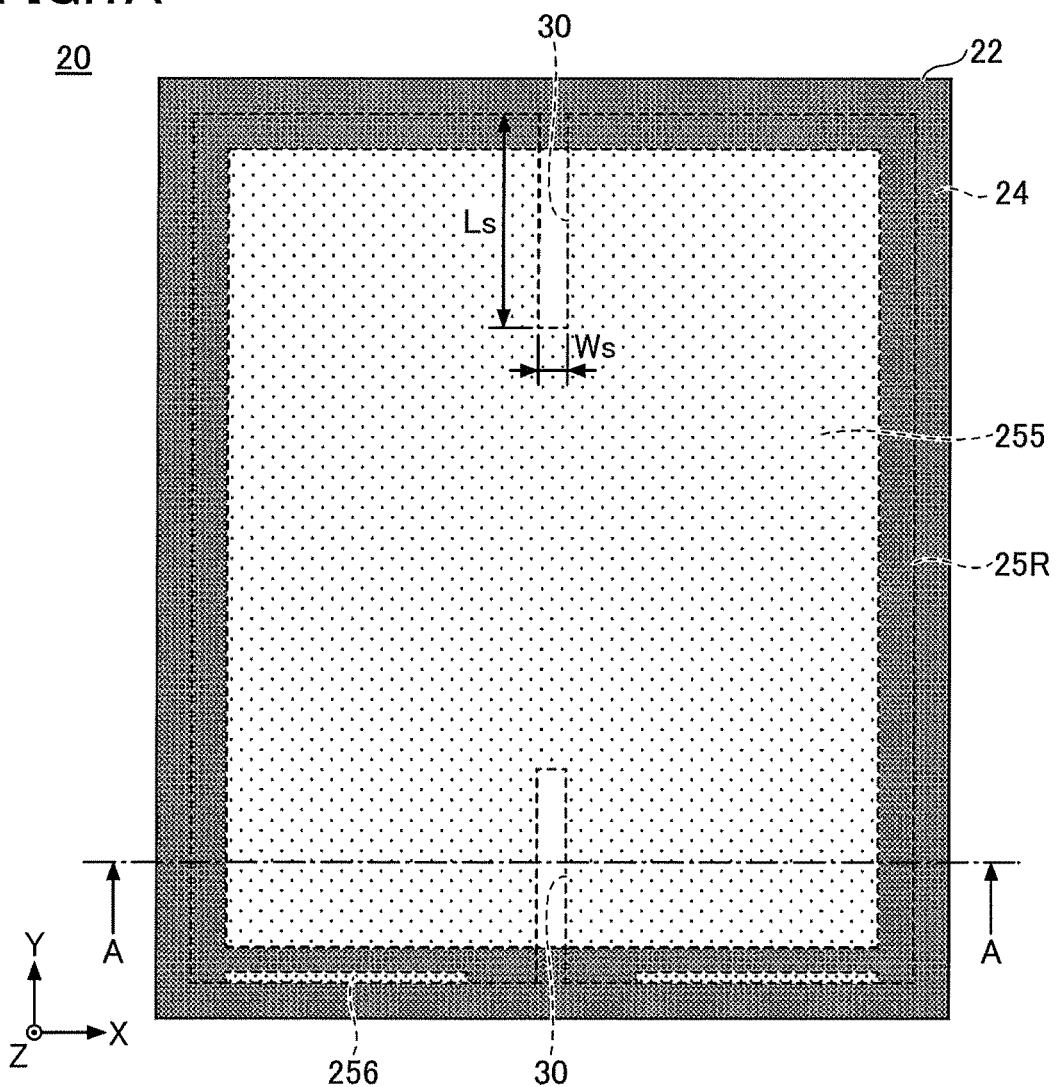
FIG. 1A is a plan view depicting an example of roof glass for a vehicle, according to a first embodiment.
Figure 1B:
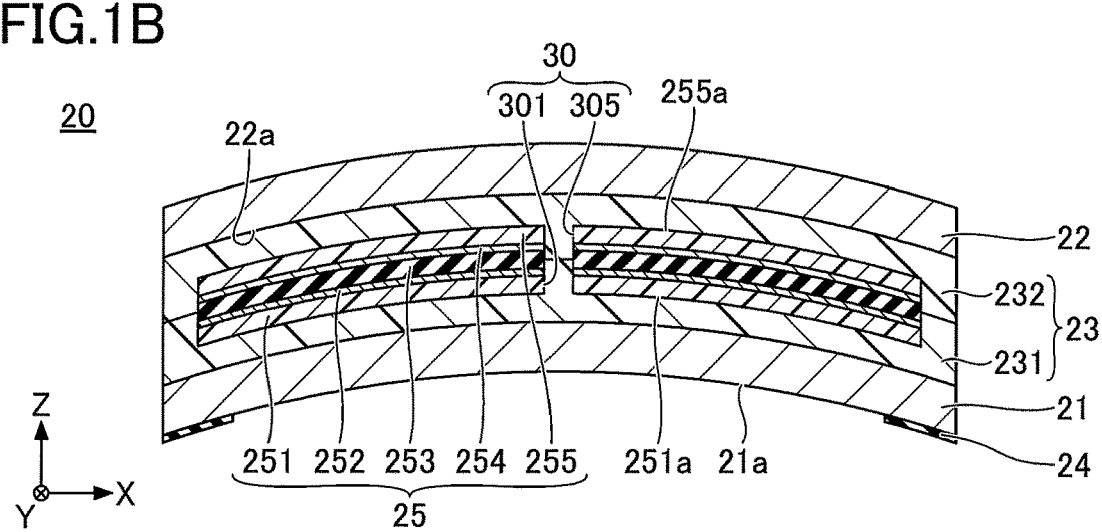
FIG. 1B is a cross sectional view depicting the example of the roof glass for the vehicle according to the first embodiment.
Figure 2:
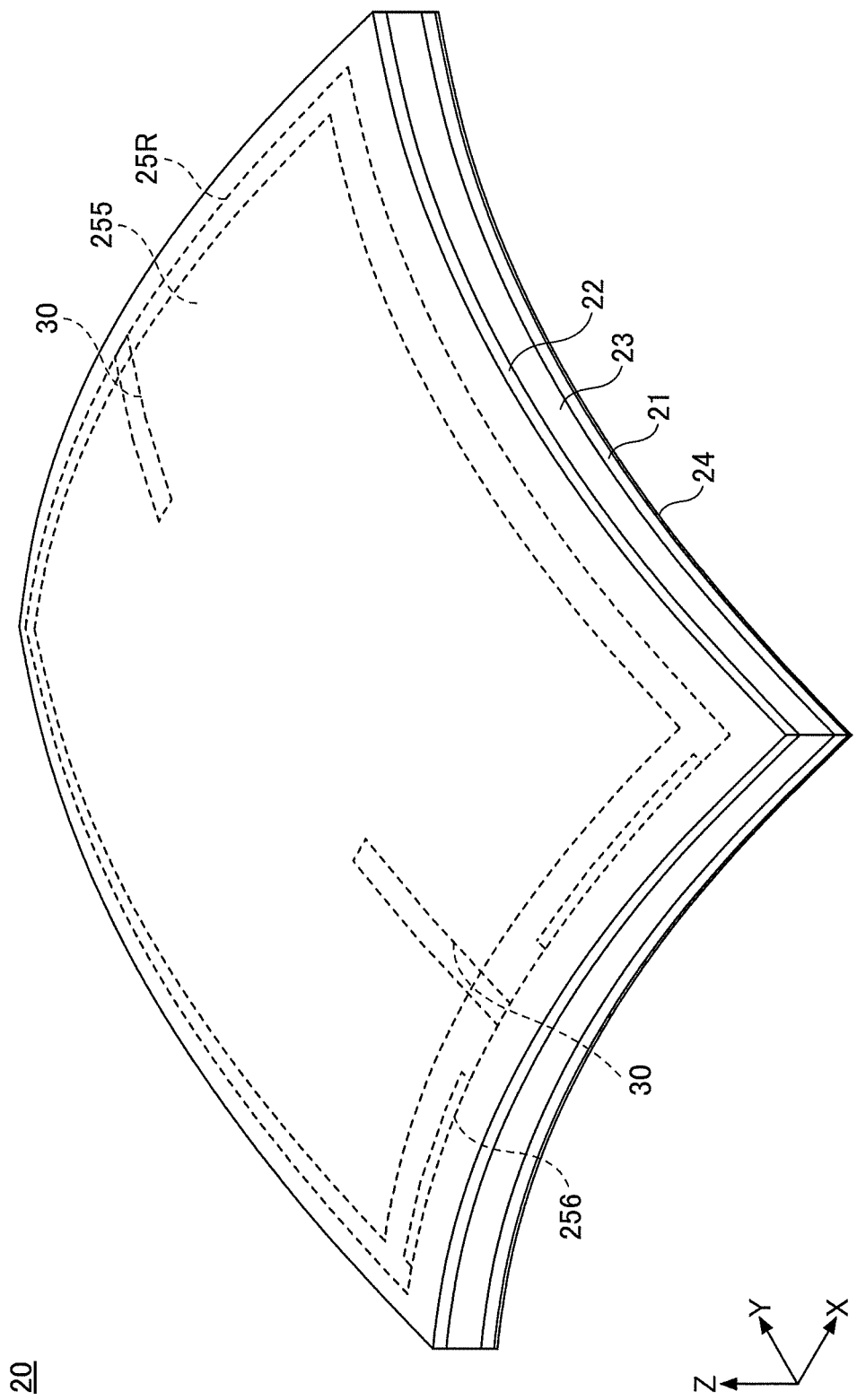
FIG. 2 is a perspective view depicting the example of the roof glass for the vehicle, according to the first embodiment.

FIGS. 1A and 1B are diagrams depicting an example of roof glass for the vehicle according to a first embodiment. FIG. 1A is a plan view and FIG. 1B is a cross sectional view cut along a line A-A shown in FIG. 1A. FIG. 2 is a perspective view depicting an example of the roof glass for the vehicle according to the first embodiment. In FIG. 2, in a plan view, a transverse direction of roof glass 20 is defined to be X-direction, a longitudinal direction is defined to be Y-direction, and a thickness direction is defined to be Z-direction. Because FIGS. 1A to 2 are schematic views, sizes may not be consistent between FIGS. 1A and 1B and FIG. 2.

As shown in FIGS. 1A to 2, the roof glass 20 is laminated glass for the vehicle that curves along the X-direction and along the Y-direction. The roof glass 20 includes a glass plate 21 which is a vehicle-interior-side glass plate, a glass plate 22 which is a vehicle-exterior-side glass plate, an intermediate film 23, a shielding layer 24, and a light control element 25. The intermediate film 23 can be formed of two layers of intermediate films 231 and 232.

The glass plate 21 is a vehicle-interior-side glass plate, which is situated on the interior-side of the vehicle upon mounting the roof glass 20 to the vehicle. Moreover, the glass plate 22 is a vehicle-exterior-side glass plate, which is situated on the exterior-side of the vehicle upon mounting the roof glass 20 to the vehicle. The glass plates 21 and 22 have predetermined curvatures.

The glass plate 21 and the glass plate 22 are a pair of glass plates that face each other. The intermediate film 23 and the light control element 25 are located between the pair of glass plates. The glass plate 21 and the glass plate 22 are fixed to each other in a state of holding the intermediate film 23 and the light control element 25 therebetween. The glass plates 21 and 22, and the intermediate film 23 will be described later in detail.

The shielding layer 24 is an opaque layer, and can be formed, for example, in a strip-like shape along a periphery of the roof glass 20. In the example shown in FIGS. 1A to 2, the shielding layer 24 is formed on a vehicle inside surface 21a of the glass plate 21. However, the shielding layer 24 may be formed on a vehicle inside surface 22a of the glass plate 22, as necessary, or may be formed on both the vehicle inside surface 21a of the glass plate 21 and the vehicle inside surface 22a of the glass plate 22.

According to the opaque shielding layer 24 present in a peripheral portion of the roof glass 20, resin such as urethane retaining the peripheral portion of the roof glass 20 to a vehicle body can be prevented from deteriorating due to ultraviolet rays. Moreover, a bus bar and an electrode can be concealed so as to be substantially unnoticeable from outside and inside the vehicle.

The light control element 25 is an element that can change transmittance of light through the roof glass 20. The light control element may be arranged over almost the entire area of the roof glass 20 as necessary, or may be arranged only in a part of the roof glass 20. A planar shape of the light control element 25 is, for example, a rectangle smaller than the planar shape of the roof glass 20. In the example shown in FIGS. 1A to 2, an outer edge portion 25R of the light control element 25 is located at a position that overlaps with the light shielding layer 24 in a plan view.

The light control element 25 is provided with a substrate 251, a conductive thin film 252, a light control layer 253, a conductive thin film 254, a substrate 255, and a pair of bus bars for controlling light 256. The light control element 25 is enclosed in the intermediate film 23, i.e. the intermediate film 23 covers the periphery of the light control element 25. A thickness of the light control element 25 is, for example, greater than or equal to 0.1 mm and less than or equal to 0.5 mm, and preferably greater than or equal to 0.1 mm and less than or equal to 0.4 mm.

The substrates 251 and 255 are transparent resin layers. Thicknesses of the substrates 251 and 255 are, for example, greater than or equal to 5 µm and less than or equal to 500 µm, preferably greater than or equal to 10 µm and less than or equal to 200 µm, and further preferably greater than or equal to 50 µm and less than or equal to 150 µm.

The substrates 251 and 255 are formed of, for example, any one selected from a group including polyethylene terephthalate, polyethylene naphthalate, polyamide, polyether, polysulfone, polyethersulfone, polycarbonate, polyarylate, polyetherimide, polyetheretherketone, polyimide, aramid, polybutyleneterephthalate, triacetylcellulose, polyurethane, and cycloolefin polymer.

The conductive thin film 252 is formed on a surface of the substrate 251 on the glass-plate-22 side, and is in contact with a surface of the light control layer 253 on the glass-plate-21 side. The conductive thin film 254 is formed on a surface of the substrate 255 on the glass-plate-21 side, and is in contact with a surface of the light control layer 253 on the glass-plate-22 side. That is, the conductive thin films 252 and 254 are a pair of conductive thin films holding the light control layer 253 therebetween.

For the conductive thin film 252 and 254, for example, transparent conductive oxide (TCO) may be used. Transparent conductive oxide (TCO) includes, for example, tin-doped indium oxide (ITO), aluminum doped zinc oxide (AZO), or indium-doped cadmium oxide. However, TCO is not limited to them.

For the conductive thin films 252 and 254, transparent conductive polymer, such as poly (3,4-ethylenedioxythiophene) (PEDOT), poly (4,4-dioctylcyclopentadithiophene), or the like can be preferably used. Moreover, for the conductive thin films 252 and 254, a laminated layered film of metal layers and dielectric layers, silver nanowire, metal meshes of silver or copper or the like can be preferably used.

The conductive thin films 252 and 254 can be formed, for example, by using physical vapor deposition (PVD), such as sputtering method, vacuum evaporation method, or ion plating method. The conductive thin films 252 and 254 may be formed by using chemical vapor deposition or wet coating method.

The light control layer 253 is held between the substrate 251, on which the conductive thin film 252 is formed, and the substrate 255, on which the conductive thin film 254 is formed. The light control layer 253 is formed of, for example, any one or more selected from a group including suspended particle devices (SPD), polymer dispersed liquid crystals (PDLL), polymer network liquid crystals (PNLC), guest-host liquid crystals, photochromic layers, electrochromic layers, and electro kinetic layers.

For the suspended particle device film, a typical SPD film, in which a polymer layer including suspended particles capable of being aligned by an application of voltage is held by two substrates having conductive thin films coated on inner surfaces thereof respectively, can be used. When a power switch is turned ON and a voltage is applied between the transparent conductive films, the suspended particles in the polymer layer align, thereby causing the SPD film to be in a state of high visible light transmittance and high transparency. In a state where the power switch is OFF, the suspended particles in the polymer layer do not align, and the SPD film has low visible light transmittance and low transparency.

For the SPD film, for example, a commercial product such as LCF-1103DHA (product name) by Hitachi Chemical Co., Ltd. can be used. Such commercial products are supplied with a predetermined size, and cut into a desired size for use. A thickness of the SPD film is not particularly limited, but preferably greater than or equal to 0.1 mm and less than or equal to 0.4 mm, from a viewpoint of easiness of handling and easiness in acquisition of the product.

In the case where polymer dispersed liquid crystal (PDLC) is used for the light control layer 253, the PDLC film is prepared by mixing prepolymer, nematic liquid crystal, and spacer material in a specified ratio; and arranging the mixture between two substrates each having a conductive thin film. The operation principle includes the following: When an electric field is not applied, liquid crystal drops can be distributed randomly in the polymer material in a state where directors of the liquid crystal drops are freely directed. In this case, a refractive index of liquid crystal to normal light does not coincide with that of the polymer material, and causes relatively strong scattering effect for light. Thus, appearance of the PDLC film becomes translucent or opaque "milk white". Under presence of electric field, the liquid crystal drops are distributed in a state where directors are aligned along a direction of the electric field, according to positive dielectric anisotropy of the liquid crystal drops. When the refractive index of liquid crystal to normal light coincides with that of the polymer material, light passes through the PDLC film, thereby giving the PDLC film a transparent appearance. Specifically, the higher the voltage supplied to the PDLC film is, the more transparent the PDLC film is. A thickness of the PDLC film is not particularly limited, but is preferably greater than or equal to 0.1 mm and less than or equal to 0.4 mm, from a viewpoint of easiness of handling and easiness in acquisition of the PDLC film.

The pair of bus bars for controlling light 256 are arranged, for example, at positions that overlap with the light shielding layer 24 in a plan view. One of the pair of bus bars for controlling light 256 is electrically connected to the conductive thin film 252, and the other bus bar is electrically connected to the conductive thin film 254. Thus, the pair of bus bars energize to the conductive thin films 252 and 254, to drive the light control layer 253.

One of electrodes of each of the pair of bus bars for controlling light 256 is, for example, a positive electrode which is connected to a positive pole of a power source, such as a battery mounted on the vehicle, via a lead wire or the like. Moreover, the other electrode of each of the pair of bus bars for controlling light 256 is, for example, a negative electrode which is connected to a negative pole of the power source, such as a battery mounted on the vehicle, via a lead wire or the like.

When a voltage is supplied to the light control layer 253 from the power source, such as a battery, via the pair of bus bars for controlling light 256, the transmittance of light control layer 253 changes according to the voltage.

For the bus bars for controlling light 256, silver paste is preferably used. Silver paste can be applied manually or by using, for example, a printing method such as screen printing. Moreover, for the bus bars for controlling light 256, copper ribbon, plain-knitted copper wire, or copper tape with conductive adhesive may be used.

In the light control element 25, two slits 30 with longitudinal directions along the Y-axis direction are formed near a center in the X-axis direction of the light control element 25, so as to face each other. The light control element 25 has an approximately H-shape appearance in a plan view.

However, the light control element 25 is not limited to this. One slit 30 may be formed in the light control element 25, or three or more slits 30 may be formed in the light control element 25. That is, one or more slits 30 may be formed in the light control element 25. Moreover, the slits 30 may be formed at any position in the light control element 25. According to the one or more slits 30 formed in the light control element 25, wrinkles can be prevented from occurring in the light control element 25.

Each of the slits 30 includes a slit 301 formed in a main surface 251a of the substrate 251 and a slit 305 formed in a main surface 255a of the substrate 255. The slit 301 penetrates through the substrate 251 and the conductive thin film 252, and the slit 305 penetrates through the substrate 255 and the conductive thin film 254. Moreover, the slit 301 extends from the substrate 251 and the conductive thin film 252 to the light control layer 253, penetrates through the light control layer 253, communicates with the slit 305, thereby forming the slit 30 penetrating through the light control element 25.

The slits 301 and 305 are formed inward from the outer edge portion 25R of the light control element 25 in a plan view. In the example shown in FIGS. 1A to 2, the slit 301 and the slit 305 have the same dimension, and are located at positions overlapping with each other in a plan view.

In the case of forming the slit 30 inward from the outer edge portion 25R of the light control element 25 in a plan view, the slit 30 is not isolated like an island in the light control element 25, and air is less likely to be left in the slit 30 during the manufacturing process of laminated glass. Thus, defects such as foaming, air inclusion are unlikely to occur. In the case where a plurality of slits 30 are present, at least one slit 30 preferably extends inward from the outer edge portion of the light control element 25 approximately perpendicularly to the outer edge portion in a plan view. More preferably, all slits 30 extend inward from the outer edge portion of the light control element 25 approximately perpendicularly to the outer edge portion in a plan view. The term "approximately perpendicularly" refers to the case where an inclination angle with respect to the direction perpendicular to the outer edge portion is greater than or equal to −10 degrees and less than or equal to 10 degrees.

In the example shown in FIGS. 1A to 2, a planar shape of the slit 30 is approximately rectangular in shape. However, the planar shape is not limited to this. The planar shape of the slit 30 can be appropriately determined by giving overall consideration to improvement with respect to wrinkle occurrence in the light control element 25, deaeration performance, and workability in the manufacturing process of laminated glass. The planar shape of the slit 30 may be, for example, a linear shape, an approximately triangular shape, an elliptic shape, or the like. In the specification of the present disclosure, the linear shape refers to a slit having a rectangular shape in a plan view with a width (Ws in FIG. 1A) of 1 mm or less.

A length Ls of the slit 30 preferably satisfies a relation of $0.55 \times Lp < Lsa$ where Lp is a length of any side of the light control element 25 and Lsa is a length of a component of the length Ls of the slit 30 parallel to the side. More preferably the length Ls satisfies a relation of $0.7 \times Lp < Lsa$. According to the above-described relation for the length Ls of the slit 30, sufficient effect of suppressing the occurrence of wrinkles in the light control element 25 is obtained.

For example, as shown in FIG. 3A, when the light control element 25 has a rectangular shape, and the slit 30 extends inward from an edge portion of a longer side of the light control element 25 and perpendicular to the longer side, a length of a shorter side Lp and the length Ls preferably satisfy the relation of $0.55 \times Lp < Lsa$, and more preferably satisfy the relation of $0.7 \times Lp < Lsa$, where Lsa is the same as Ls.

For example, when the light control element 25 has a quadrangular shape, and the slit 30 extends inward from an edge portion of a side of the light control element 25 obliquely to the side, any one of pairs of lengths Lp of the sides of the quadrangle and lengths Lsa of components of the length Ls of the slit 30 parallel to the sides, respectively, preferably satisfy the relation of $0.55 \times Lp < Lsa$, and more preferably satisfy the relation of $0.7 \times Lp < Lsa$. Specifically, in the example shown in the upper part of FIG. 3B, a relation of $0.7 \times Lp1 < Lsa$ or $0.7 \times Lp2 < Lsa$ is more preferably satisfied. Alternatively, in the example shown in the lower part of FIG. 3B, a relation of $0.7 \times Lp1 < Lsa1$ or $0.7 \times Lp2 < Lsa2$ is more preferably satisfied.

For example, when the light control element 25 has a quadrangular shape, and the plurality of slits 30 are provided in the light control element 25, any one of pairs of lengths Lp of sides of the quadrangle and sums Lsa of lengths of components of lengths of the plurality of slits 30 parallel to the sides, respectively, preferably satisfy the relation of $0.55 \times Lp < Lsa$, and more preferably satisfy the relation of $0.7 \times Lp < Lsa$. Specifically, in the example shown in the upper part of FIG. 3C, a relation of $0.7 \times Lp1 < Lsa3 + Lsa4$ or $0.7 \times Lp2 < Lsa3 + Lsa4$ is more preferably satisfied. Alternatively, in the example shown in the lower part of FIG. 3C, a relation of $0.7 \times Lp1 < Lsa5$ or $0.7 \times Lp2 < Lsa6$ is more preferably satisfied.

Moreover, a relation of $0.72 \times Lp < Lsa$ is preferably satisfied, and more preferably a relation of $0.75 \times Lp < Lsa$ is satisfied.

The longer the length Ls of the slit 30 is, the more significant the effect of suppressing occurrence of wrinkles in the light control element 25 is.

Moreover, as the length of the slit 30 becomes longer, the light control element 25 becomes difficult to handle during the manufacturing process of laminated glass. Thus, a relation of $Ls < 0.95Lp$ is preferably satisfied. As long as the relation of $Ls < 0.95Lp$ is satisfied, the light control element 25 can be handled without any problem during the manufacturing process of laminated glass.

Returning to FIGS. 1A to 2, the width Ws of the slit 30 is, for example, greater than or equal to 0.1 mm and less than or equal to 50 mm, preferably greater than or equal to 1 mm and less than or equal to 40 mm, and more preferably greater than or equal to 10 mm and less than or equal to 40 mm. When the width Ws of the slit 30 is greater than or equal to 0.1 mm, wrinkles can be prevented from occurring in the light control element 25. Moreover, when the width Ws of the slit 30 is less than or equal to 50 mm, air is less likely to be left in the slit 30 during the manufacturing process of laminated glass. Thus, defects such as foaming, air inclusion are unlikely to occur.

The slit 30 preferably extends in a direction approximately perpendicular to any of the sides of the light control element 25. In the example shown in FIGS. 1A to 2, the slit 30 extends in the Y-axis direction perpendicular to the two shorter sides of the light control element 25 facing each other and being parallel to the X-axis direction. According to the above-described arrangement, wrinkles can be prevented from occurring in the light control element 25, as compared with the case where the slit 30 extends obliquely to any of the sides of the light control element 25. This is because when the slit extends obliquely to any of the sides, contribution of the length Ls of the slit is not efficient.

Machining of the slit 30 may be performed during the preparing of the light control element 25 or after the preparing of the light control element 25. In either case, a cutting plotter machining device, a punching device, a laser cutter, a pair of scissors, a cutter knife, a chisel, or the like may be preferably used.

In the case where the slit 30 is machined during the preparing of the light control element 25, first the slit 301 is machined in the substrate 251 on which the conductive thin film 252 is formed, and the slit 305 is machined in the substrate 255 on which the conductive thin film 254 is formed. Then, for example, a light control layer 253 in liquid form is cast between the substrate 251 with the slit 301 and the substrate 255 with the slit 305, and cured. Once cured, preparation of the light control element 25 is completed. In the above-described process, peripheries of the slits 301 and 305 may be sealed by sealing members, as necessary.

In the case where the slit 30 is processed after preparing the light control element 25, the substrate 251 on which the conductive thin film 252 is formed, the light control layer 253, and the substrate 255 on which the conductive thin film 254 is formed are simultaneously machined. Then, the slit 30 including the slits 301 and 305 is formed. This case is preferable because the slit 30 including the slits 301 and 305 can be machined all at once and productivity is high. In this process, peripheries of the slits 301 and 305 may be sealed by sealing members, as necessary.

Figure 4:
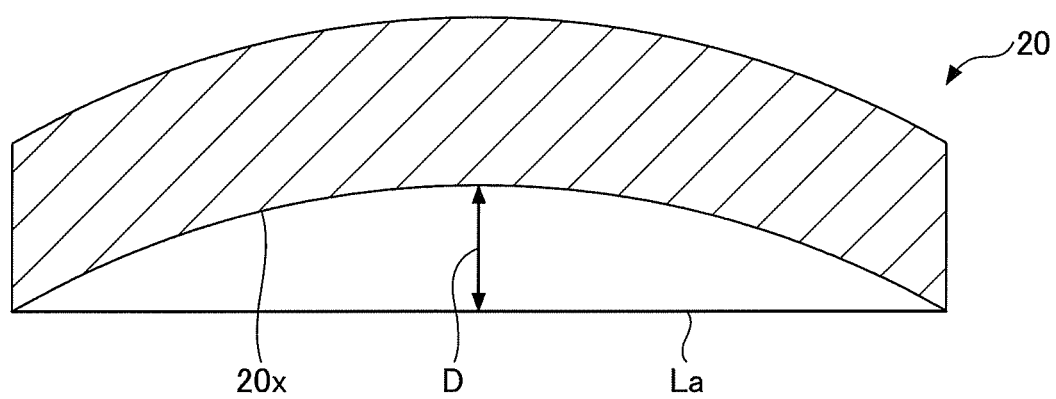
FIG. 4 is a diagram for explaining a maximum bending depth of the roof glass.

FIG. 4 is a diagram for explaining a maximum bending depth of the roof glass. As shown in FIG. 4, in which the roof glass 20 is arranged so that a concave surface 20x of the roof glass 20 is oriented downward, and a pair of sides of the roof glass 20 facing each other are connected with a straight line La. The maximum bending depth D is expressed by a length, in unit of mm, of a line, which is orthogonal to the line La, from the deepest point of a concave surface 20x of the roof glass 20 to the line La. The maximum bending depth D is a value expressing a bending degree of the roof glass 20. The greater the value of the maximum bending depth D is, the more easily wrinkles are generated in the light control element 25 and thus the more significant the property of the slit 30 formed in the light control element 25 that suppresses the occurrence of wrinkles is.

In the following, the glass plate 21, the glass plate 22, and the intermediate film 23 will be described in detail.

In the roof glass 20, the vehicle inside surface 21a of the glass plate 21 (an inner surface of the roof glass 20) and the vehicle outside surface 22a of the glass plate 22 (an outer surface of the roof glass 20) are curved surfaces.

For the glass plates 21 and 22, inorganic glass such as soda lime glass or aluminosilicate glass, organic glass, or the like may be used. When inorganic glass is used, the glass plates 21 and 22 can be manufactured, for example, by float process.

A thickness of the glass plate 22 situated on the exterior-side of the roof glass 20 is preferably greater than or equal to 1.3 mm and less than or equal to 3 mm at the thinnest portion. When the thickness of the glass plate 22 is greater than or equal to 1.3 mm, sufficient strength, such as durability against a flying stone is obtained. When the thickness is less than or equal to 3 mm, the laminated glass is not excessively heavy, and it is preferable in fuel consumption of the vehicle. The thickness of the thinnest portion of the glass plate 22 is more preferably greater than or equal to 1.8 mm and less than or equal to 2.8 mm, and further preferably greater than or equal to 1.8 mm and less than or equal to 2.6 mm.

A thickness of the glass plate 21 situated on the interior-side of the roof glass 20 is preferably greater than or equal to 0.3 mm and less than or equal to 2.3 mm. When the thickness of the glass plate 21 is greater than or equal to 0.3 mm, excellent handling performance can be obtained. When the thickness is less than or equal to 2.3 mm, the roof glass 20 is not excessively heavy.

The glass plates 21 and 22 are subjected to a bending-forming process, for example, after forming by float process or the like, and before causing the glass plates to adhere to each other via the intermediate film 23. The bending-forming process is performed while softening the glass plates by heating. A heating temperature for the glass plates in the bending-forming process is about greater than 550° C. and less than 700° C.

For the intermediate film 23 causing the glass plate 21 and the glass plate 22 to adhere to each other, thermoplastic resin is often used. The thermoplastic resin is thermoplastic resin that has been conventionally used for the purpose of this kind, and includes, for example, plasticized polyvinyl acetal-based resin, plasticized polyvinyl chloride-based resin, saturated polyester-based resin, plasticized saturated polyester-based resin, polyurethane-based resin, plasticized polyurethane-based resin, ethylene-vinyl acetate copolymer-based resin, ethylene-ethyl acrylate copolymer-based resin, or the like. Moreover, resin composition including modified block copolymer hydride, disclosed in Japanese Patent No. 6065221, can be preferably used.

Among the above-described resins, a plasticized polyvinyl acetal-based resin is preferably used, because of its excellence in balance of performances, such as transparency, weather resistance, strength, bond strength, resistance to penetration, absorbability for impact energy, humidity resistance, thermal insulating property, and sound insulating property. The thermoplastic resin may be used singly, or two or more types of thermoplastic resins may be used in combination. The term "plasticized" in the plasticized polyvinyl acetal-based resin means that the resin is plasticized by adding a plasticizing agent. The same applies to the other plasticized resins.

The polyvinyl acetal-based resin may include polyvinyl formal resin that is obtained by reacting polyvinyl alcohol (in the following, may be referred to as "PVA" as necessary) and formaldehyde, narrowly defined polyvinyl acetal-based resin that is obtained by reacting PVA and an acetaldehyde, polyvinyl butyral resin (in the following, may be referred to as "PVB" as necessary) that is obtained by reacting PVA and n-butyl aldehyde, and the like. Especially, PVB is preferable, because of its excellence in balance of performances, such as transparency, weather resistance, strength, bond strength, resistance to penetration, absorbability for impact energy, humidity resistance, thermal insulating property, and sound insulating property. The polyvinyl acetal resin may be used singly, or two or more types of polyvinyl acetal-based resins may be used in combination. However, a material forming the intermediate film 23 is not limited to thermoplastic resin. Moreover, the intermediate film 23 may include functional particles, such as infrared absorbent, ultraviolet light absorbent, or luminescent agent.

A film thickness of the thinnest portion of the intermediate film 23 is preferably greater than or equal to 0.3 mm. When the film thickness of the intermediate film 23 is greater than or equal to 0.3 mm, sufficient impact resistance required for roof glass is obtained. Moreover, the film thickness of the thickest portion of the intermediate film 23 is preferably less than or equal to 3 mm. When the maximum value of the film thickness of the intermediate film 23 is less than or equal to 3 mm, the laminated glass is not excessively heavy. The maximum value of the film thickness of the intermediate film 23 is more preferably less than or equal to 2.8 mm, and further preferably less than or equal to 2.6 mm.

Note that the intermediate film 23 may have three or more layers. For example, by configuring the intermediate film 23 with three layers, and making the hardness of a central layer less than the hardness of both adjacent layers by controlling the plasticizing agent or the like, the sound insulating property of the laminated glass can be enhanced. In this case, the hardness of both of the adjacent layers may be the same or may be different from each other.

Moreover, as the intermediate film 23, an intermediate film having a casing structure covering an outer periphery portion of the light control element 25 may be used separately.

In order to prepare the intermediate film 23, for example, the aforementioned resin material, that comprises the intermediate film, is properly selected, and an extrusion molding is performed using an extruder in a heated and molten state. An extrusion condition, such as an extrusion rate of the extruder, is set to be uniform. Afterwards, the extrusion shaped resin film is extended as necessary in order to have curvatures in an upper side and a lower side so as to fit a shape of the roof glass 20, and upon doing so the intermediate film 23 is completed.

In order to prepare laminated glass, a laminated body is formed by holding the intermediate film 23 and the light control element 25 between the glass plate 21 and the glass plate 22. For example, the laminated body is placed in a rubber bag, and the bonding is performed under a vacuum of −65 to −100 kPa and at a temperature of about 70 to 100° C. The heating condition, the temperature condition and the laminating method are appropriately determined taking the property of the light control element into consideration so that the light control element does not deteriorate during the laminating process.

Furthermore, for example, by performing a pressure bonding process of heating and pressurizing under a condition of a temperature of 100 to 150° C., and a pressure of 0.6 to 1.3 MPa, the durability of the laminated glass can be improved. However, in some cases, taking into account simplification of processes, and characteristics of a material enclosed in the laminated glass, the heating and pressurizing process is not necessarily used.

Moreover, between the glass plate 21 and the glass plate 22, other than the intermediate film 23 and the light control element 25, a film or a device having a function of light emission, visible light reflection, scattering, decoration, absorption, or the like may be arranged, as long as the effect of the present application is not affected. Moreover, the film or the device having the above-described function may be formed directly on the main surfaces of the glass plate 21 and the glass plate 22.

As described above, the roof glass 20 is a curved laminated glass. Moreover, one or more slits 30 are formed in the light control element 25 enclosed in the intermediate film 23. Furthermore, the slits 30 include the slit 301 formed in the main surface 251a of the substrate 251, and the slit 305 formed in the main surface 255a of the substrate 255. By forming the one or more slits 30 in the light control element 25, wrinkles can be prevented from occurring in the light control element 25.

In particular, a width Lp of the light control element 25 on the same axis as the slit 30 and a length Ls of the slit 30 preferably satisfy a relation of $0.3 \times Lp < Ls < 0.95 \times Lp$. When the relation is satisfied, the roof glass 20 with high quality, having an effect that wrinkles are prevented from occurring in the light control element 25, and being provided with a conduction path for supplying power to the light control element 25 less likely to be disconnected, can be obtained.

First Variation of the First Embodiment

In a first variation of the first embodiment, a slit which is not in contact with the outer edge portion of the light control element will be shown as an example. In the first variation of the first embodiment, descriptions of the same elements as those in the first embodiment, which have already been described, may be omitted.

Figure 5A:
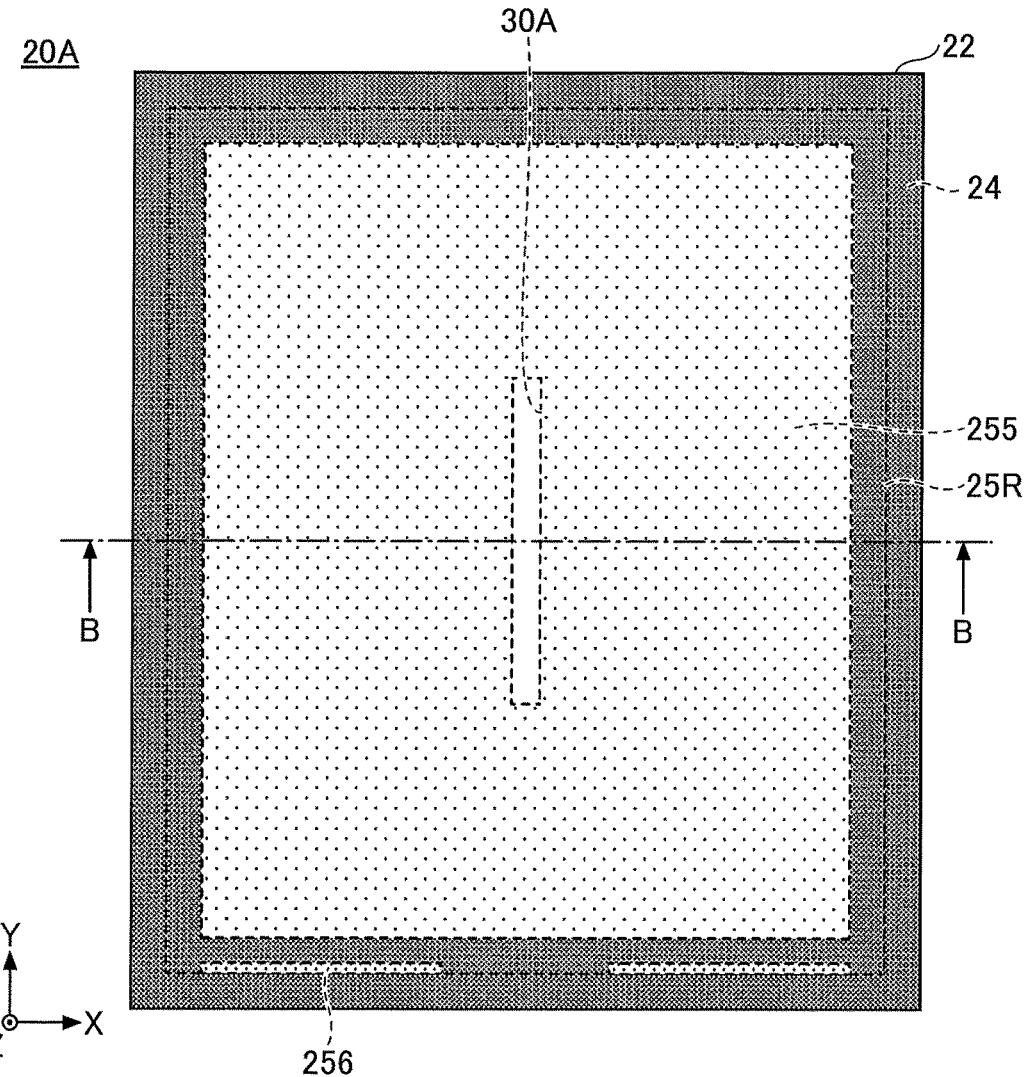
FIG. 5A is a plan view depicting an example of roof glass for the vehicle according to a first variation of the first embodiment.
Figure 5B:
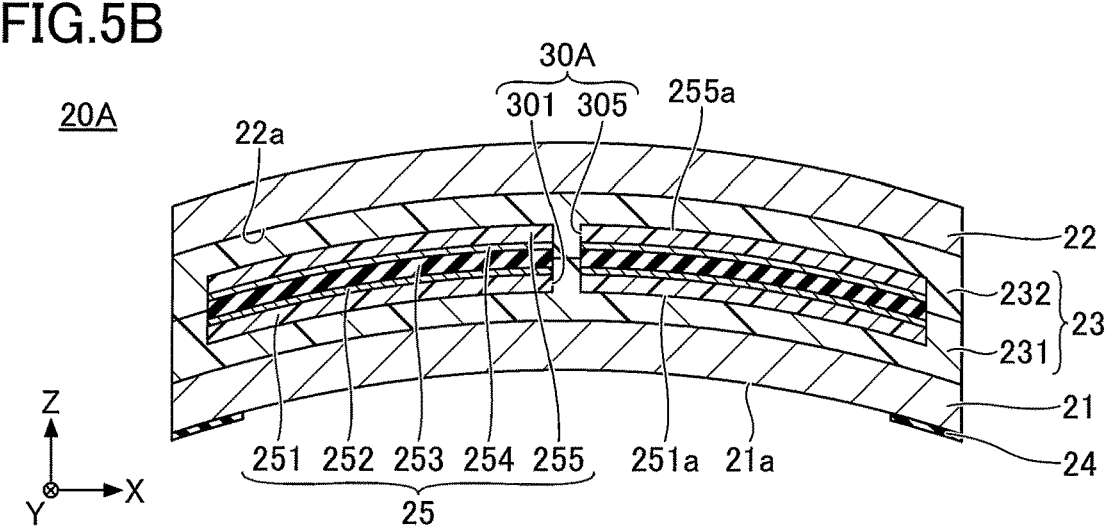
FIG. 5B is a cross-sectional view depicting the example of the roof glass for the vehicle according to the first variation of the first embodiment.

FIGS. 5A and 5B are diagrams depicting an example of roof glass for the vehicle according to the first variation of the first embodiment. FIG. 5A is a plan view, and FIG. 5B is a cross-sectional view cut along a line of B-B shown in FIG. 5A.

As shown in FIGS. 5A and 5B, roof glass 20A according to the first variation is different from the roof glass 20 (See FIGS. 1A and 1B) in that the slit 30 is replaced with a slit 30A.

In the light control element 25, the slit 30A with a longitudinal direction along the Y-axis direction is formed near a center in the X-axis direction of the light control element 25. The slit 30A is surrounded by the respective layers of the light control element 25 in a plan view, and is not in contact with the outer edge portion 25R of the light control element 25.

In the example shown in FIG. 5A, one slit 30A that is not in contact with the outer edge portion 25R of the light control element 25 is formed in the light control element 25. However, the first variation is not limited to this. Two or more slits 30A, which are not in contact with the outer edge portion 25R of the light control element 25, may be formed in the light control element 25. That is, one or more slits 30A, which are not in contact with the outer edge portion 25R of the light control element 25 may be formed in the light control element 25. Moreover, the slits 30A may be formed at any position in the light control element 25, as long as the slits 30A are not in contact with the outer edge portion 25R of the light control element 25.

As described above, when the one or more slits 30A, which are not in contact with the outer edge portion 25R of the light control element 25, are formed in the light control element 25, wrinkles are prevented from occurring in the light control element 25. Moreover, because the slit 30A does not have a portion that is cut into the light control element 25 inward from the outer edge portion 25R of the light control element 25, the light control element 25 can be handled easily.

Second Variation of the First Embodiment

In a second variation of the first embodiment, an example of a slit that does not penetrate through the light control element will be shown. In the second variation of the first embodiment, descriptions of the same elements as those in the embodiments, which have already been described, may be omitted.

Figure 6A:
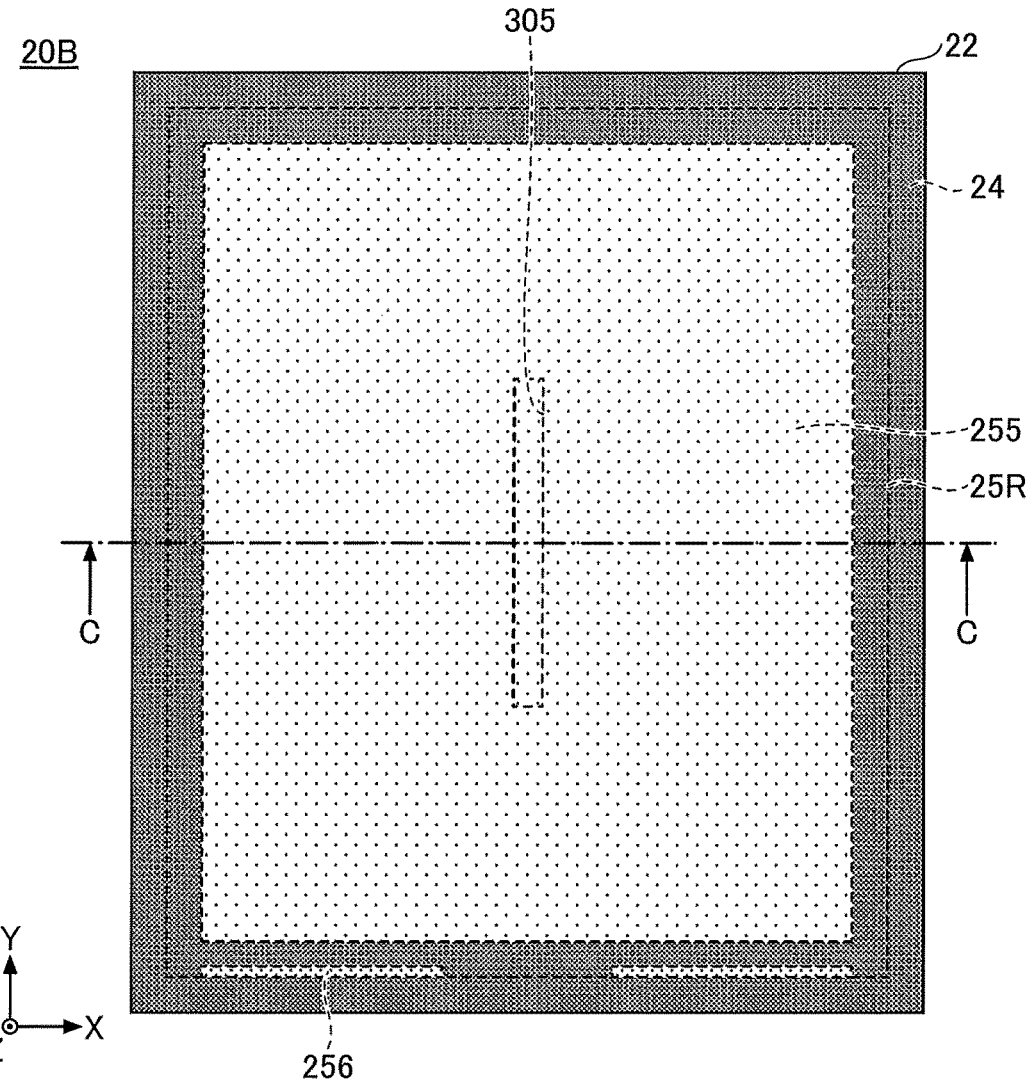
FIG. 6A is a plan view depicting an example of roof glass for the vehicle according to a second variation of the first embodiment.
Figure 6B:
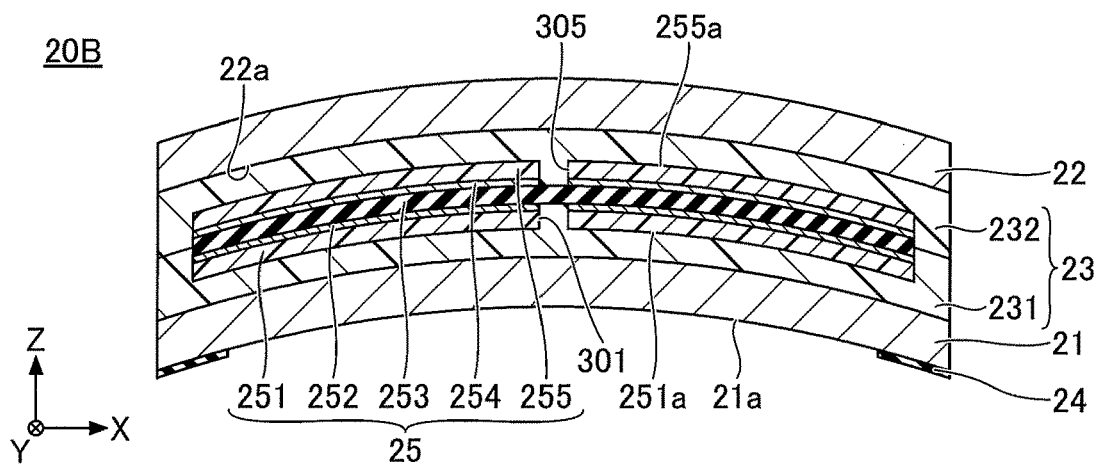
FIG. 6B is a cross-sectional view depicting the example of the roof glass for the vehicle according to the second variation of the first embodiment.

FIGS. 6A and 6B are diagrams depicting an example of roof glass for the vehicle according to the second variation of the first embodiment. FIG. 6A is a plan view, and FIG. 6B is a cross-sectional view cut along a line of C-C shown in FIG. 6A.

As shown in FIG. 6B, the roof glass 20B according to the second variation is different from the roof glass 20A (See FIG. 5B) in that the slit 301 and the slit 305 do not communicate with each other penetrating through the light control layer 253 different from the slit 30A.

In the light control element 25, one slit 301 with a longitudinal direction along the Y-axis direction is formed near a center in the X-axis direction of the light control element 25 on the main surface 251a of the substrate 251, and one slit 305 with a longitudinal direction along the Y-axis direction is formed near a center in the X-axis direction of the light control element 25 on the main surface 255a of the substrate 255.

In a plan view, the slits 301 and 305 are surrounded by the respective layers of the light control element 25, and are not in contact with the outer edge portion 25R of the light control element 25. However, the slits 301 and 305 may be formed inward from the outer edge portion 25R of the light control element 25, in a plan view, as the slit 30 shown in FIG. 1A.

The slit 301 penetrates through the substrate 251 and the conductive thin film 252, but does not penetrate the light control layer 253. Moreover, the slit 305 penetrates through the substrate 255 and the conductive thin film 254, but does not penetrate the light control layer 253. That is, one main surface of the light control layer 253 is exposed in the slit 301 and the other main surface of the light control layer 253 is exposed in the slit 305, without forming any slits in the light control layer 253.

In the example shown in FIGS. 6A and 6B, one slit 301 and one slit 305 that do not penetrate the light control layer 253 are formed in the light control element 25. However, the second variation is not limited to this. Two or more slits 301 and two or more slits 305 that do not penetrate the light control layer 253 may be formed in the light control element 25. That is, one or more slits 301 and one or more slits 305 that do not penetrate the light control layer 253 may be formed in the light control element 25. Moreover, the slits 301 and the slits 305 may be formed at any positions in the light control element 25, as long as the slits 301 and 305 do not penetrate the light control layer 253.

The slits 301 and 305 that do not penetrate through the light control layer 253 may be formed, for example, by using a cutting plotter machining device, a punching device, a laser cutter, a pair of scissors, a cutter knife, a chisel, or the like, after preparing the light control element 25.

As described above, one or more slits 301, which do not penetrate the light control layer 253, may be formed in the main surface 251a of the substrate 251, and one or more slits 305, which do not penetrate the light control layer 253, may be formed in the main surface 255a of the substrate 255. According to the above-described configuration, wrinkles can be prevented from occurring in the light control element 25.

Moreover, only the substrate 251 and the conductive thin film 252 are cut according to the formation of the slit 301, and only the substrate 255 and the conductive thin film 254 are cut according to the formation of the slit 305. Thus, the light control layer 253 is not cut but connected. Because the light control layer 253 does not have a discontinuous region and the slits 301 and 305 are inconspicuous, the appearance of the roof glass 20B is preferable as compared with the case of forming the slit penetrating through the light control layer 253.

Figure 7A:
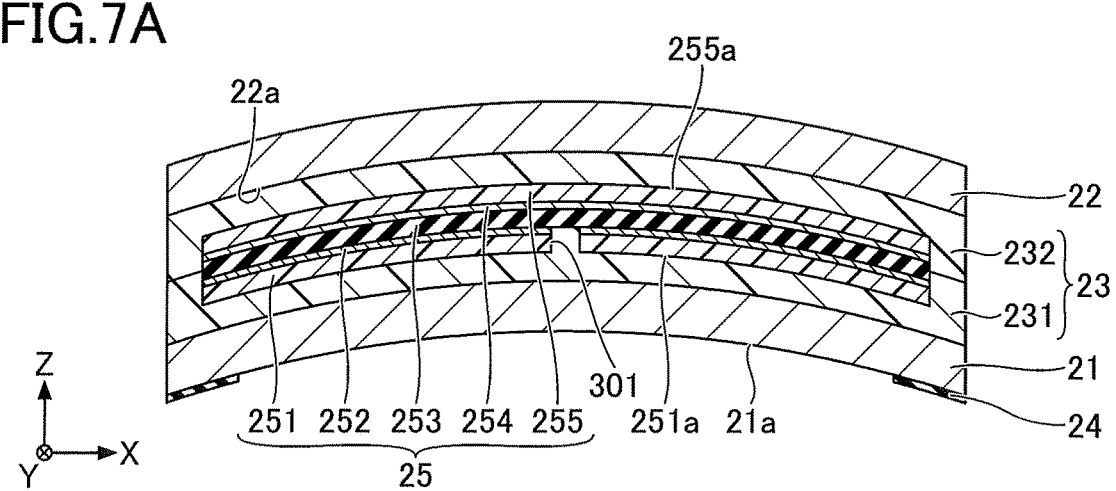
FIG. 7A is a cross-sectional view depicting another example of the roof glass for the vehicle according to the second variation of the first embodiment.

As shown in FIG. 7A, one or more slits 301, which do not penetrate the light control layer 253, may be formed in the main surface 251a of the substrate 251 without forming a slit in the main surface 255a of the substrate 255. According to the above-described configuration, wrinkles can be prevented from occurring mainly in the light control element 25. Moreover, a slit may be formed in the light control layer 253 so as not to penetrate through the light control layer 253.

Figure 7B:
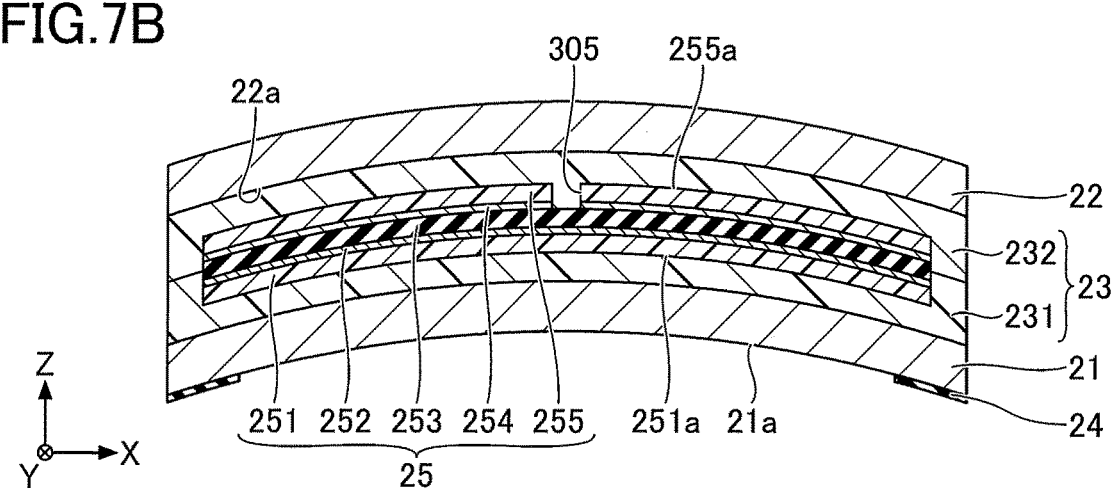
FIG. 7B is a cross-sectional view depicting yet another example of the roof glass for the vehicle according to the second variation of the first embodiment.

Moreover, as shown in FIG. 7B, one or more slits 305, which do not penetrate through the light control layer 253, may be formed in the main surface 255a of the substrate 255 without forming a slit in the main surface 251a of the substrate 251. According to the above-described configuration, wrinkles can be prevented from occurring mainly in the light control element 25. Moreover, a slit may be formed in the light control layer 253 to the extent that the slit does not penetrate through the light control layer 253.

Figure 7C:
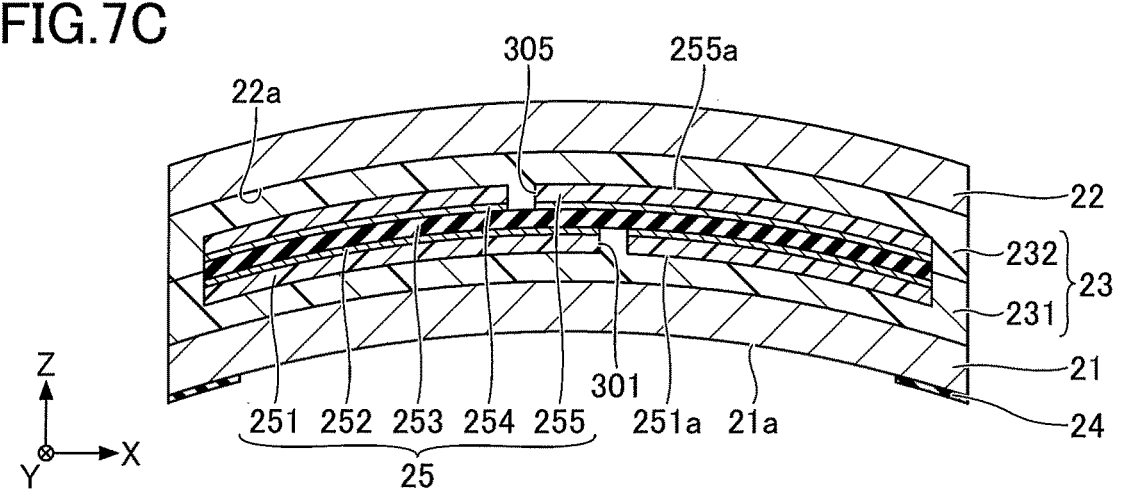
FIG. 7C is a cross-sectional view depicting still another example of the roof glass for the vehicle according to the second variation of the first embodiment.

Moreover, as shown in FIG. 7C, one or more slits 301, which do not penetrate through the light control layer 253, may be formed in the main surface 251a of the substrate 251, and one or more slits 305, which do not penetrate through the light control layer 253, may be formed in the main surface 255a of the substrate 255 at a position which is shifted from a position of the slit 301. According to the above-described configuration, a mechanical strength of the light control element 25 can be prevented from deteriorating near the slits 301 and 305. Moreover, a slit may be formed in the light control layer 253 to the extent that the slit does not penetrate through the light control layer 253.

Third Variation of the First Embodiment

In a third variation of the first embodiment, another example of the slit that does not penetrate through the light control element will be shown. In the third variation of the first embodiment, descriptions of the same elements as those in the embodiments, which have already been described, may be omitted.

Figure 8A:
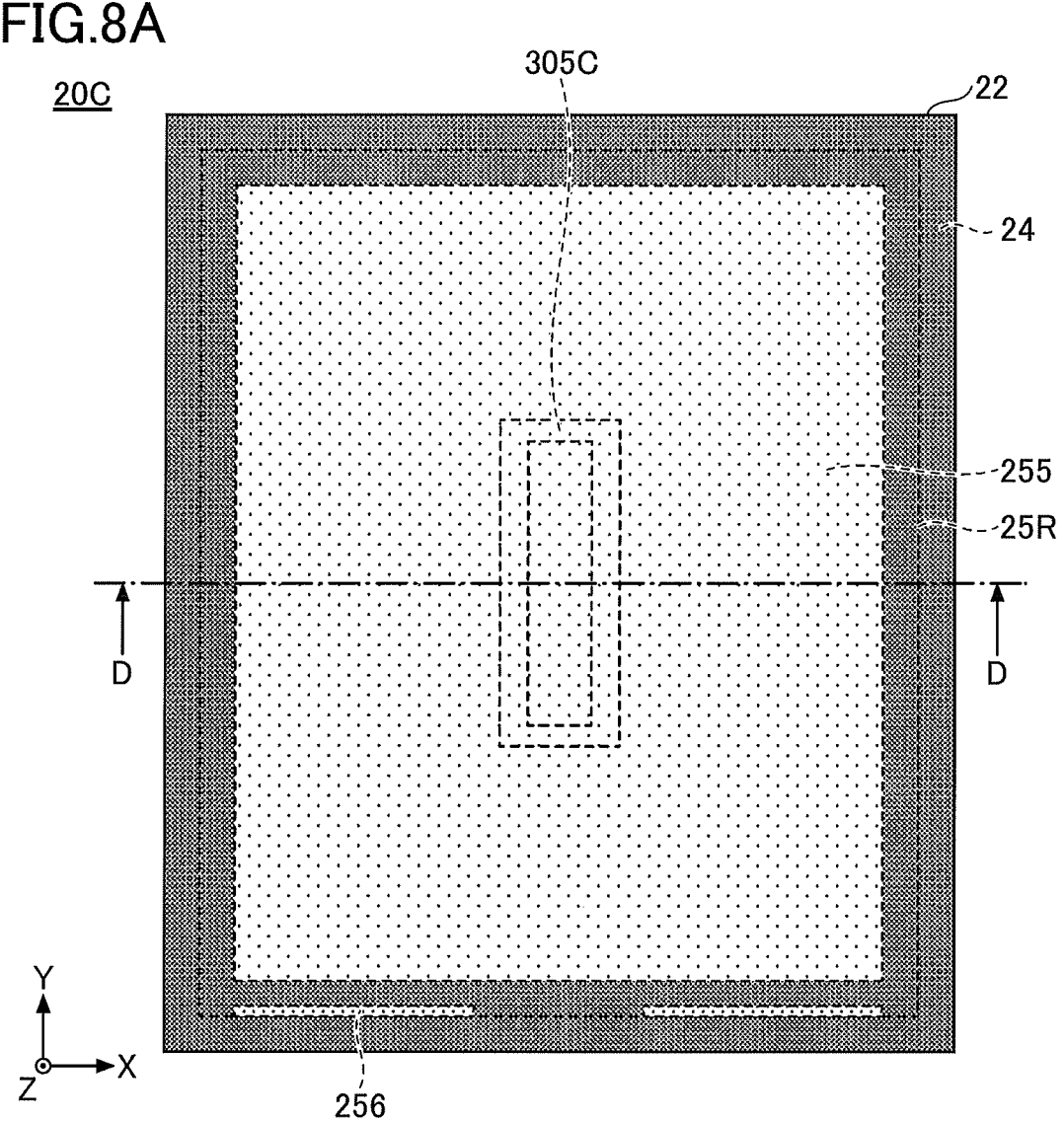
FIG. 8A is a plan view depicting an example of roof glass for the vehicle according to a third variation of the first embodiment.
Figure 8B:
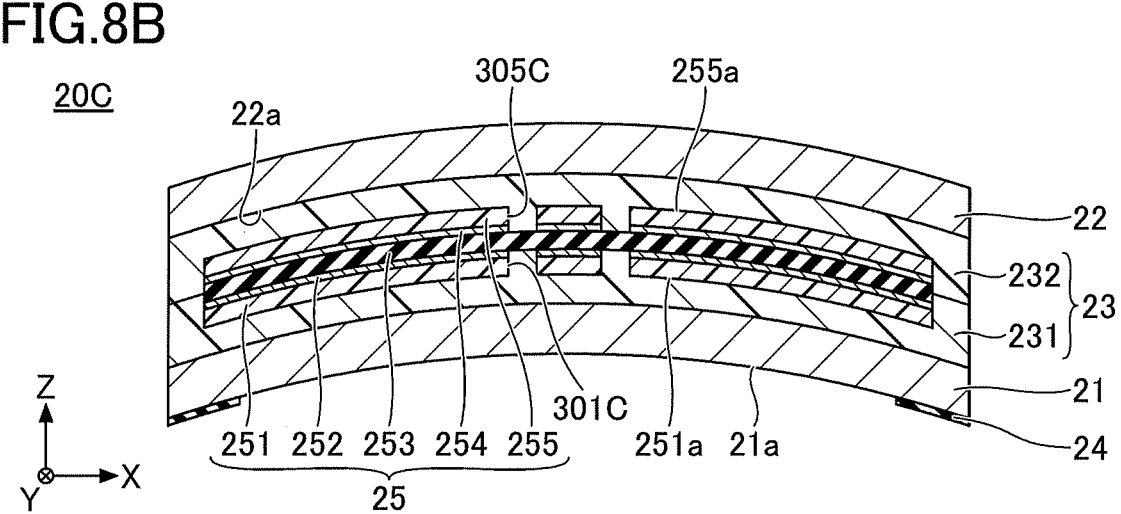
FIG. 8B is a cross-sectional view depicting the example of the roof glass for the vehicle according to the third variation of the first embodiment.

FIGS. 8A and 8B are diagrams depicting an example of roof glass for the vehicle according to the third variation of the first embodiment. FIG. 8A is a plan view, and FIG. 8B is a cross-sectional view cut along a line of D-D shown in FIG. 8A.

As shown in FIGS. 8A and 8B, the roof glass 20C according to the third variation is different from the roof glass 20B (See FIGS. 6A and 6B) in that the slits 301 and 305 are replaced with slits 301C and 305C, respectively.

In the light control element 25, an annular slit 301C with a longitudinal direction along the Y-axis direction is formed near a center in the X-axis direction of the light control element 25 on the main surface 251a of the substrate 251. Moreover, an annular slit 305C with a longitudinal direction along the Y-axis direction is formed near a center in the X-axis direction of the light control element 25 on the main surface 255a of the substrate 255.

In a plan view, the slits 301C and 305C are surrounded by the respective layers of the light control element 25 outside the slits 301C and 305C, and are not in contact with the outer edge portion 25R of the light control element 25. Moreover, inside the slits 301C and 305C the respective layers of the light control element 25 remain. However, the slits 301C and 305C may be formed inward from the outer edge portion 25R of the light control element 25, in a plan view, as the slit 30 shown in FIG. 1A.

The slit 301C penetrates through the substrate 251 and the conductive thin film 252, but does not penetrate the light control layer 253. Moreover, the slit 305C penetrates through the substrate 255 and the conductive thin film 254, but does not penetrate the light control layer 253. That is, one main surface of the light control layer 253 is exposed in the slit 301C and the other main surface of the light control layer 253 is exposed in the slit 305C, without forming any slits in the light control layer 253.

In the example shown in FIGS. 8A and 8B, one annular slit 301C and one annular slit 305C that do not penetrate the light control layer 253 are formed in the light control element 25. However, the third variation of the embodiment is not limited to this. Two or more annular slits 301C and two or more annular slits 305C that do not penetrate the light control layer 253 may be formed in the light control element 25. That is, one or more annular slits 301C and one or more annular slits 305C that do not penetrate the light control layer 253 may be formed in the light control element 25. Moreover, the annular slits 301C and the annular slits 305C may be formed at any positions in the light control element 25, as long as the annular slits 301C and 305C do not penetrate the light control layer 253.

The annular slits 301C and 305C that do not penetrate through the light control layer 253 may be formed, for example, by using a cutting plotter machining device, a punching device, a laser cutter, a pair of scissors, a cutter knife, a chisel, or the like, after preparing the light control element 25.

As described above, one or more annular slits 301C, which do not penetrate the light control layer 253, may be formed in the main surface 251a of the substrate 251, and one or more annular slits 305C, which do not penetrate the light control layer 253, may be formed in the main surface 255a of the substrate 255. Also in this case, the same effect as in the second variation of the first embodiment is obtained, and the slits are not isolated like an island in the light control element 25. Thus, the deaeration performance in the manufacturing process of the laminated glass is excellent.

Fourth Variation of the First Embodiment

In a fourth variation of the first embodiment, an example in which a shielding layer is present at a position of the slit will be shown. In the fourth variation of the first embodiment, descriptions of the same elements as those in the embodiments, which have already been described, may be omitted.

Figure 9A:
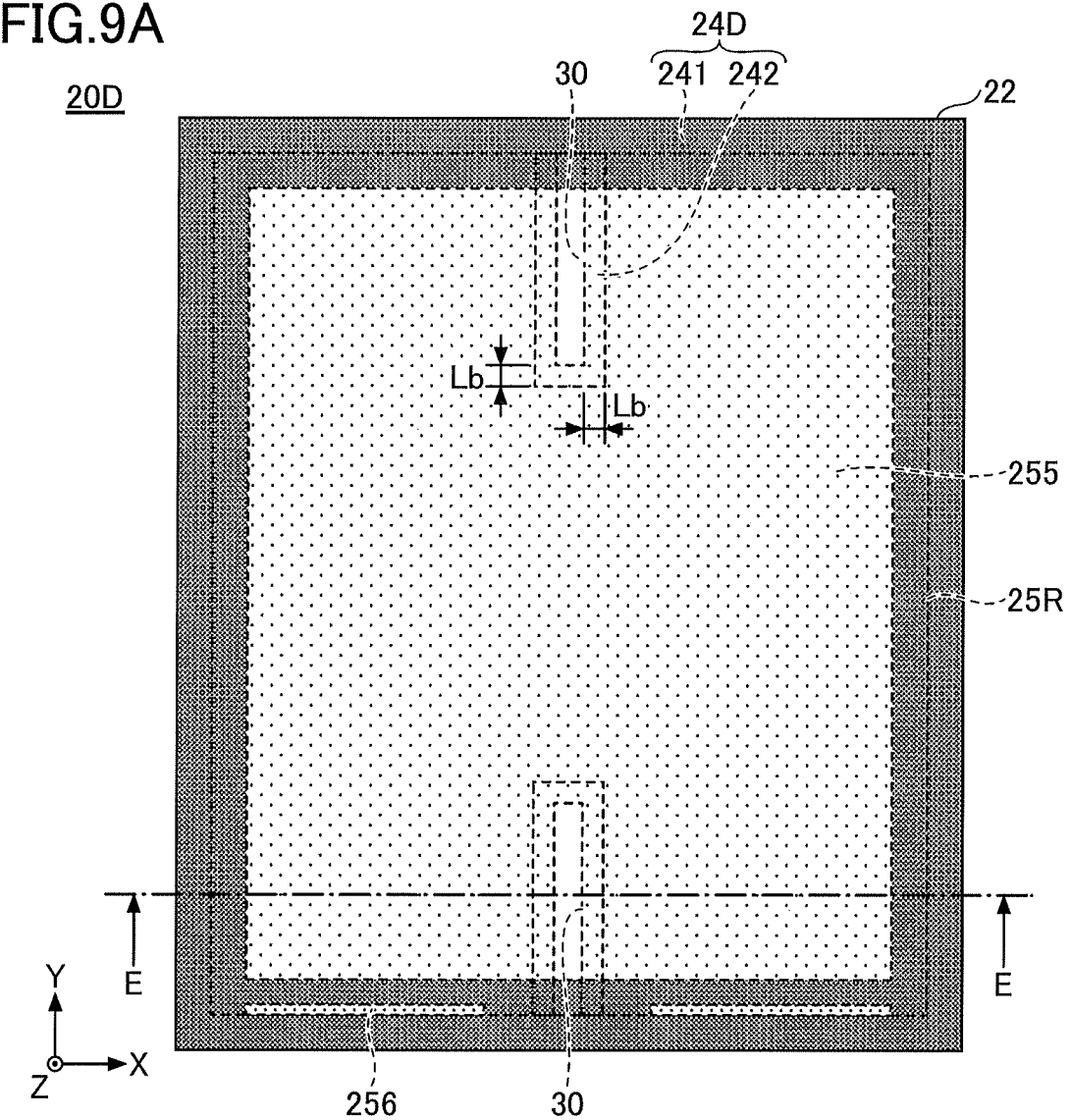
FIG. 9A is a plan view depicting an example of roof glass for the vehicle according to a fourth variation of the first embodiment.
Figure 9B:
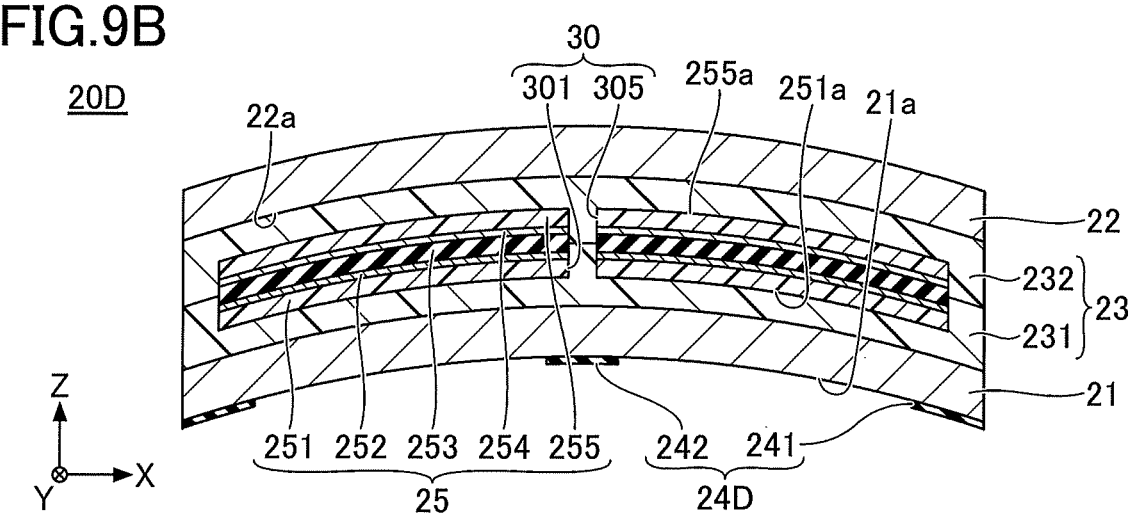
FIG. 9B is a cross-sectional view depicting the example of the roof glass for the vehicle according to the fourth variation of the first embodiment.

FIGS. 9A and 9B are diagrams depicting an example of roof glass for the vehicle according to the fourth variation of the first embodiment. FIG. 9A is a plan view, and FIG. 9B is a cross-sectional view cut along a line of E-E shown in FIG. 9A.

As shown in FIGS. 9A and 9B, the roof glass 20D according to the fourth variation is different from the roof glass 20 (See FIGS. 1A and 1B) in that the shielding layer 24 is replaced with a shielding layer 24D.

The shielding layer 24D is provided with a peripheral region 241 arranged in a strip-like shape along the periphery of the roof glass 20D, and a projection portion 242 that projects inward from the peripheral region in a plan view. Then, the slit 30 is formed at a position overlapping with the projection portion 242 of the shielding layer 24D in a plan view. In other words, the projection portion 242 extending from the peripheral region 241 is arranged in order to hide the slit 30.

As described above, the slit 30 is formed at the position overlapping with the projection portion 242 of the shielding layer 24D in a plan view, and thereby the slit 30 is concealed. Thus, the appearance of the roof glass 20D is favorable. In this configuration, an outer edge of the slit 30 is preferably apart from an outer edge of the projection portion 242 overlapping with the slit 30 in a plan view by 10 mm or more, and more preferably by 15 mm or more. That is, in FIG. 9A, a distance Lb between the outer edge of the slit 30 and the outer edge of the projection portion 242 is preferably greater than or equal to 10 mm. When the distance Lb is greater than or equal to 10 mm, an allowable range for position displacement of the light control element during manufacturing the laminated glass is wide, and productivity is prevented from being lowered. Thus, the above-described configuration is desirable.

Practical Examples and Comparative Example

In the following, practical examples and a comparative example will be described. The present invention is not limited to the practical examples. In the following, Example 1 refers to a comparative example, and Examples 2 to 9 refer to practical examples.

First, glass plates 21 and 22, an intermediate film 23, and a light control element 25 were provided. Specifications of these elements are as follows: Dimensions of the glass plates 21 and 22 were 1120 mm×1320 mm×2 mm. For the intermediate film 23, a PVB film with a thickness of 0.38 mm (by Solutia Japan Ltd.) was used. For the light control element 25, an SPD film (LCF-1103DHA (product name) by Hitachi Chemical Co., Ltd.), in which a thickness of a light control layer was 90 μm, was used. Dimensions of the light control element 25 were 850 mm×1100 mm×0.35 mm.

Next, laminated glasses of Example 1 to Example 9 were prepared using the above-described glass plates 21 and 22, the intermediate film 23 and the light control element 25. Specifically, the intermediate film 23 and the light control element 25 were held by the glass plates 21 and 22 therebetween, to prepare a laminated body. Then, the laminated body was placed in a rubber bag in a vacuum of −65 to −100 kPa at a temperature of approximately 70 to 110° C., so that the glass plates were bonded to each other. Thus, the laminated glasses of Example 1 to Example 9 were prepared. In addition, before preparing the laminated body, a shielding layer of black ceramic was arranged in an almost annular region on the surface of the laminated glass of 100 mm in width inward from an outer periphery of the glass plates 21 and 22 (40 mm from an outer periphery of the light control element 25).

In the laminated glass of Example 1, a slit was not formed in the light control element 25. In each of the laminated glasses of Example 2 to Example 9, two rectangular slits with a longer side length and a shorter side length listed in FIG. 10 were formed at the positions indicated in FIG. 1A. Moreover, in each of Example 1 to Example 9, a bending depth of the laminated glass on the same axis with the slit in the laminated glass was as specified in FIG. 10. The slit longer side length Lsa listed in FIG. 10 refers to a sum of longer side lengths of two slits.

Next, laminated glasses of Example 1 to Example 9, were visually observed for any occurrences of wrinkles in the light control element 25, and evaluated in 3 stages of "A", "B" and "C". In the evaluation of wrinkles, "A" was assigned to the case where no occurrence of wrinkles was observed, "B" was assigned to the case where occurrence of wrinkles was observed on 1 to 3 sides among 4 sides of the light control element 25, and "C" was assigned to the case where on all 4 sides of the light control element 25 occurrence of wrinkles was observed. Results of the evaluation are shown in FIG. 10.

As shown in FIG. 10, wrinkles are found to be prevented from occurring in the light control element 25 by including slits in the light control element 25. Particularly, when a ratio of the slit longer side length to a length of a side of the light control element 25 parallel to the direction of the slit longer side (Lsa/Lp) is greater than or equal to 0.7, the effect of suppressing the occurrence of wrinkles in the light control element 25 was found to further increase. The effect of suppressing the occurrence of wrinkles in the light control element 25 was found to be independent of the width of the slit.

As described above, preferred embodiments and the like have been described in detail. The present invention is not limited to the embodiments or the like. Various variations and replacements may be made without departing from the scope of the present invention.

What is claimed is:

1. Laminated glass comprising:
   a pair of glass plates each having a curvature;
   an intermediate film located between the pair of glass plates; and
   a light control element enclosed in the intermediate film, wherein the light control element includes
      a first resin layer;
      a second resin layer; and a light control layer held by the first resin layer and the second resin layer, wherein one or more slits are provided in a main surface of the first resin layer wherein one or more slits are provided in a main surface of the second resin layer, and wherein the slit formed in the main surface of the first resin layer and the slit formed in the second resin layer have identical dimensions, and are located at a position overlapping with each other in a plan view.

2. The laminated glass according to claim 1, wherein the slit formed in the main surface of the first resin layer extends to the light control layer, penetrates through the light control layer, and communicates with the slit formed in the main surface of the second resin layer.

3. The laminated glass according to claim 1, wherein at least one of the slits is not in contact with an outer edge portion of the light control element.

4. The laminated glass according to claim 1, wherein at least one of the slits extends inward from an outer edge portion of the light control element in a plan view.

5. The laminated glass according to claim 4, wherein at least one of the slits extends inward and an inclination angle with respect to a direction perpendicular to the outer edge portion of the light control element is greater than or equal to −10 degrees and less than or equal to 10 degrees, in a plan view.

6. The laminated glass according to claim 1, wherein the slit satisfies, for a side of the light control element, a relation with a length Lsa of a component of a length Ls of the slit parallel to the side and a length Lp of the side, being 0.55×Lp<Lsa, and wherein when a plurality of slits are present, a sum of lengths Lsa of components of lengths Ls of the plurality of slits parallel to the side and the length Lp of the side satisfy the relation.

7. The laminated glass according to claim 1, wherein the slit satisfies, for a side of the light control element, a relation with a length Lsa of a component of a length Ls of the slit parallel to the side and a length Lp of the side, being 0.7×Lp<Lsa, and wherein when a plurality of slits are present, a sum of lengths Lsa of components of lengths Ls of the plurality of slits parallel to the side and the length Lp of the side satisfy the relation.

8. The laminated glass according to claim 1, wherein a width of the light control element on the same axis of the slit is Lp, a length of the slit Ls satisfies a relation of 0.3×Lp<Ls<0.95×Lp.

9. The laminated glass according to claim 1, wherein a width of at least one of the slits is greater than or equal to 0.1 mm and less than or equal to 50 mm.

10. The laminated glass according to claim 9, wherein the width of at least one of the slits is greater than or equal to 1 mm and less than or equal to 40 mm.

11. The laminated glass according to claim 1, wherein at least one of the slits penetrates through the first resin layer, and does not penetrate through the light control layer.

12. The laminated glass according to claim 1, wherein the first resin layer and the second resin layer are formed of any one selected from a group including polyethylene terephthalate, polyethylene naphthalate, polyamide, polyether, polysulfone, polyethersulfone, polycarbonate, polyarylate, polyetherimide, polyetheretherketone, polyimide, aramid, polybutyleneterephthalate, triacetylcellulose, polyurethane, and cycloolefin polymer.

13. The laminated glass according to claim 1, wherein a thickness of the light control element is greater than or equal to 0.1 mm and less than or equal to 0.5 mm.

14. The laminated glass according to claim 1, wherein the light control layer is formed of any one or more selected from a group including suspended particle devices, polymer dispersed liquid crystals, polymer network liquid crystals, guest-host liquid crystals, photochromic layers, electrochromic layers, and electro kinetic layers.

15. The laminated glass according to claim 1, wherein a shielding layer is formed on at least one of the pair of glass plates, and wherein at least one of the slits overlaps with the shielding layer in a plan view.

16. The laminated glass according to claim 5, wherein an outer edge of the slit overlapping with the shielding layer in a plan view is apart from an outer edge of the shielding layer by 10 mm or more.

17. The laminated glass according to claim 16, wherein the outer edge of the slit overlapping with the shielding layer in a plan view is apart from the outer edge of the shielding layer by 15 mm or more.

18. The laminated glass according to claim 1, wherein a shape of the slit is a rectangular shape, a linear shape, a triangular shape, or an elliptic shape.

19. The laminated glass according to claim 1, wherein a bending depth on the same axis with the slit is greater than or equal to 60 mm and less than or equal to 80 mm.

* * * * *